Figure 13:
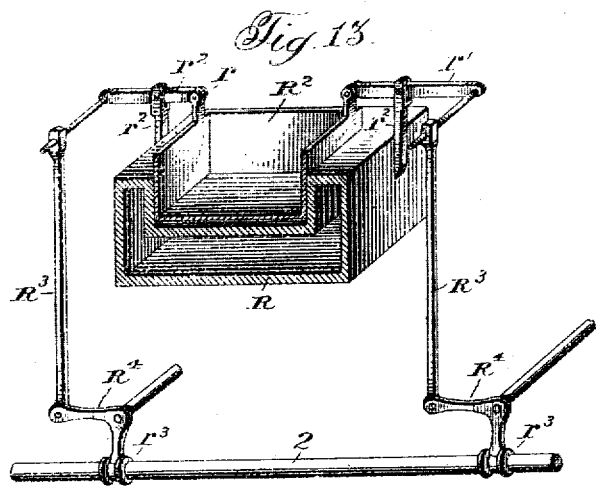

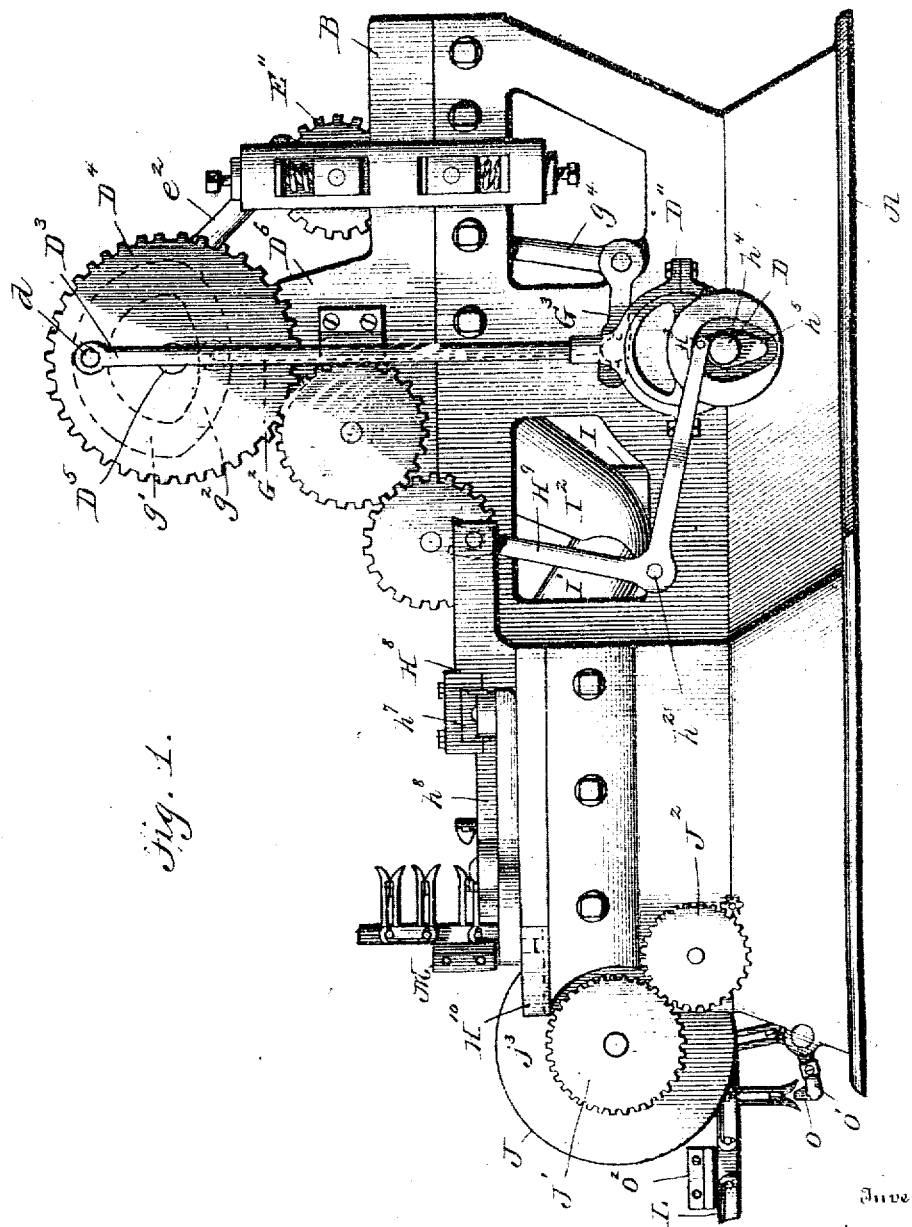

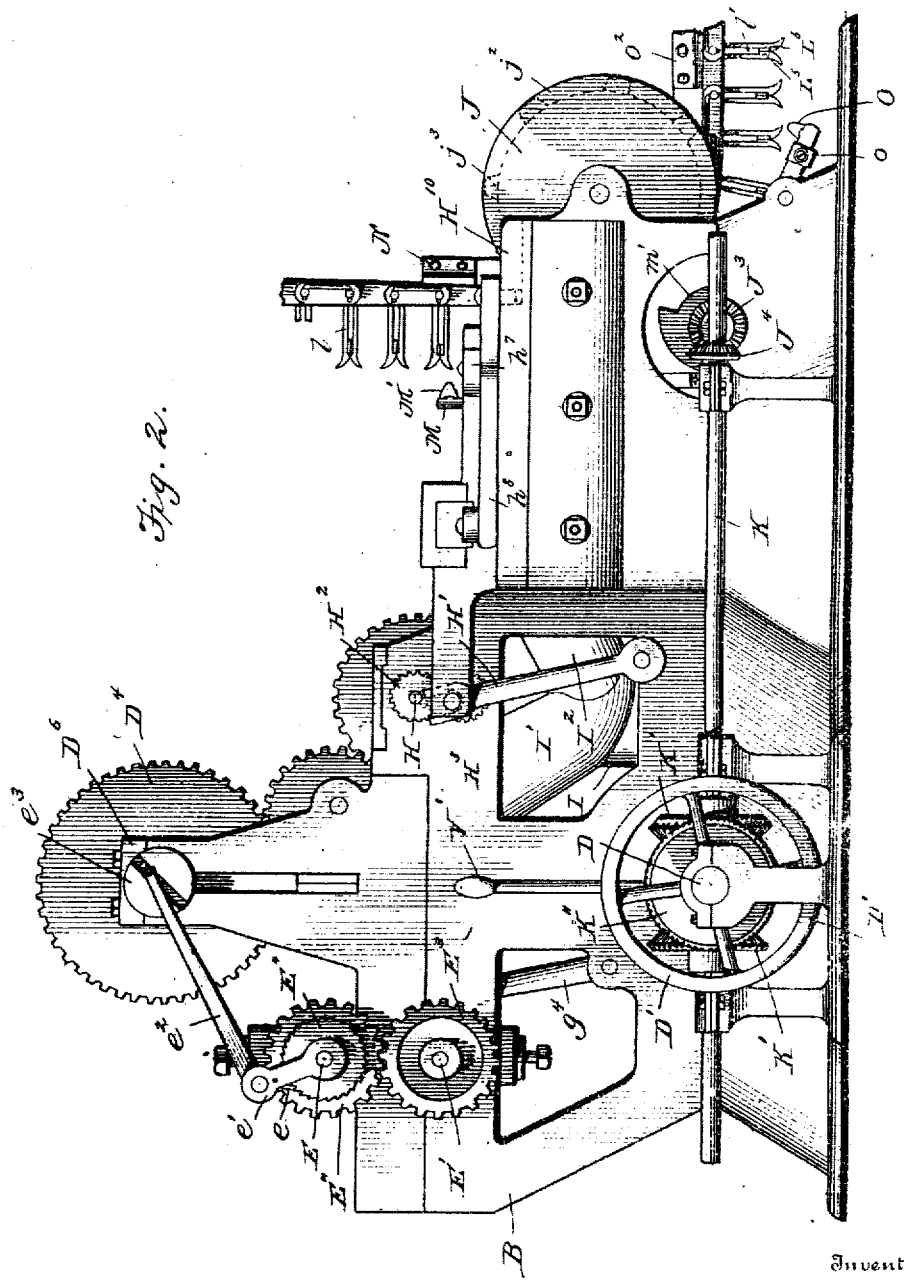

No. 814,210. PATENTED MAR. 6, 1906.
W. R. HOPE & G. A. ROBINSON.
MATCH MAKING MACHINE.
APPLICATION FILED AUG. 4, 1900.
13 SHEETS—SHEET 3.
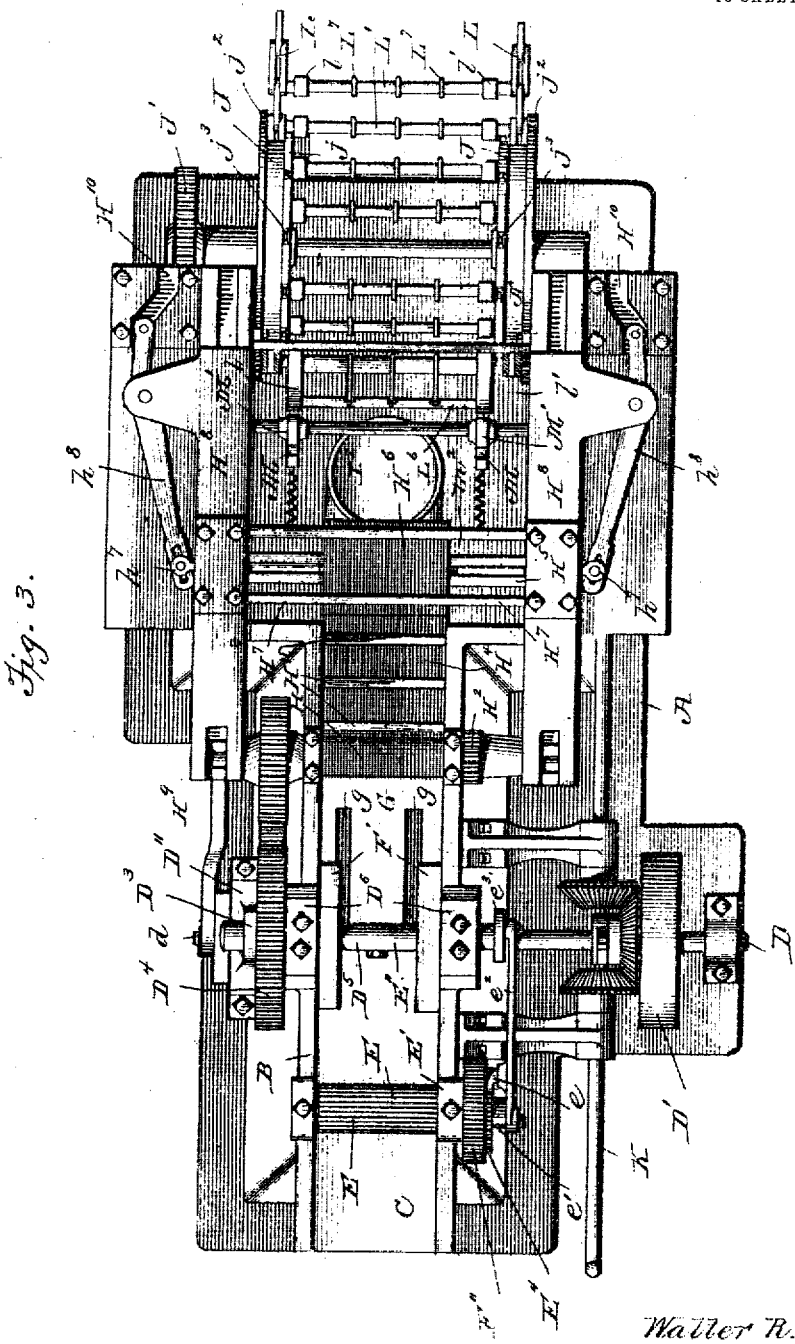
Witnesses
Inventors
Walter R. Hope
George A. Robinson

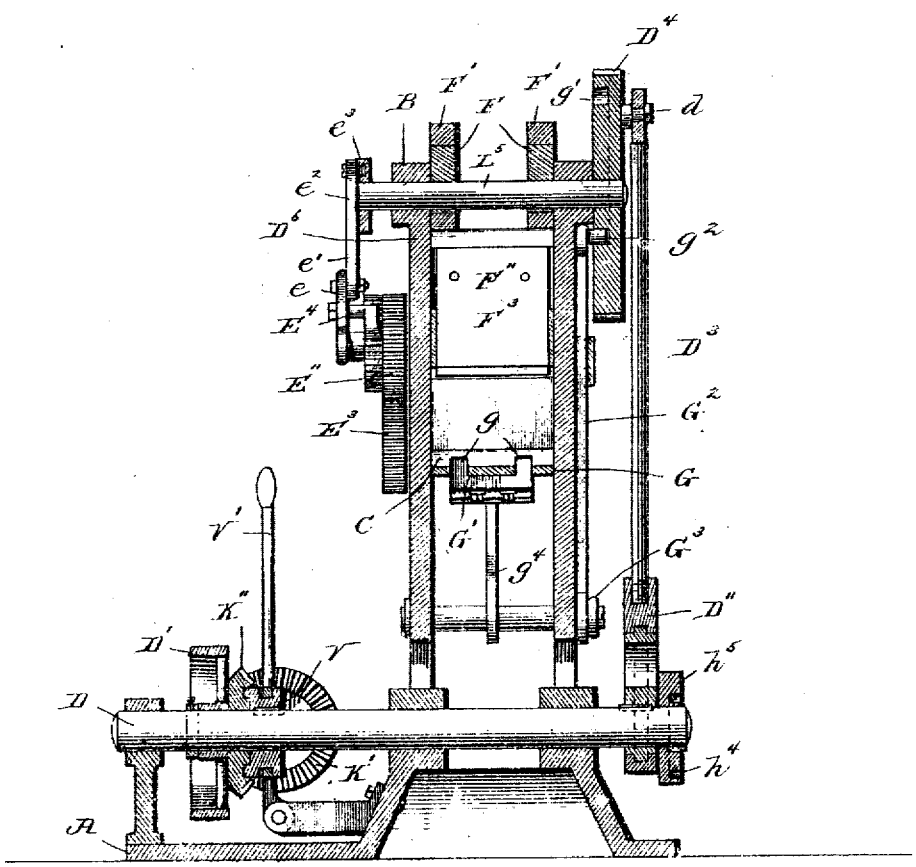

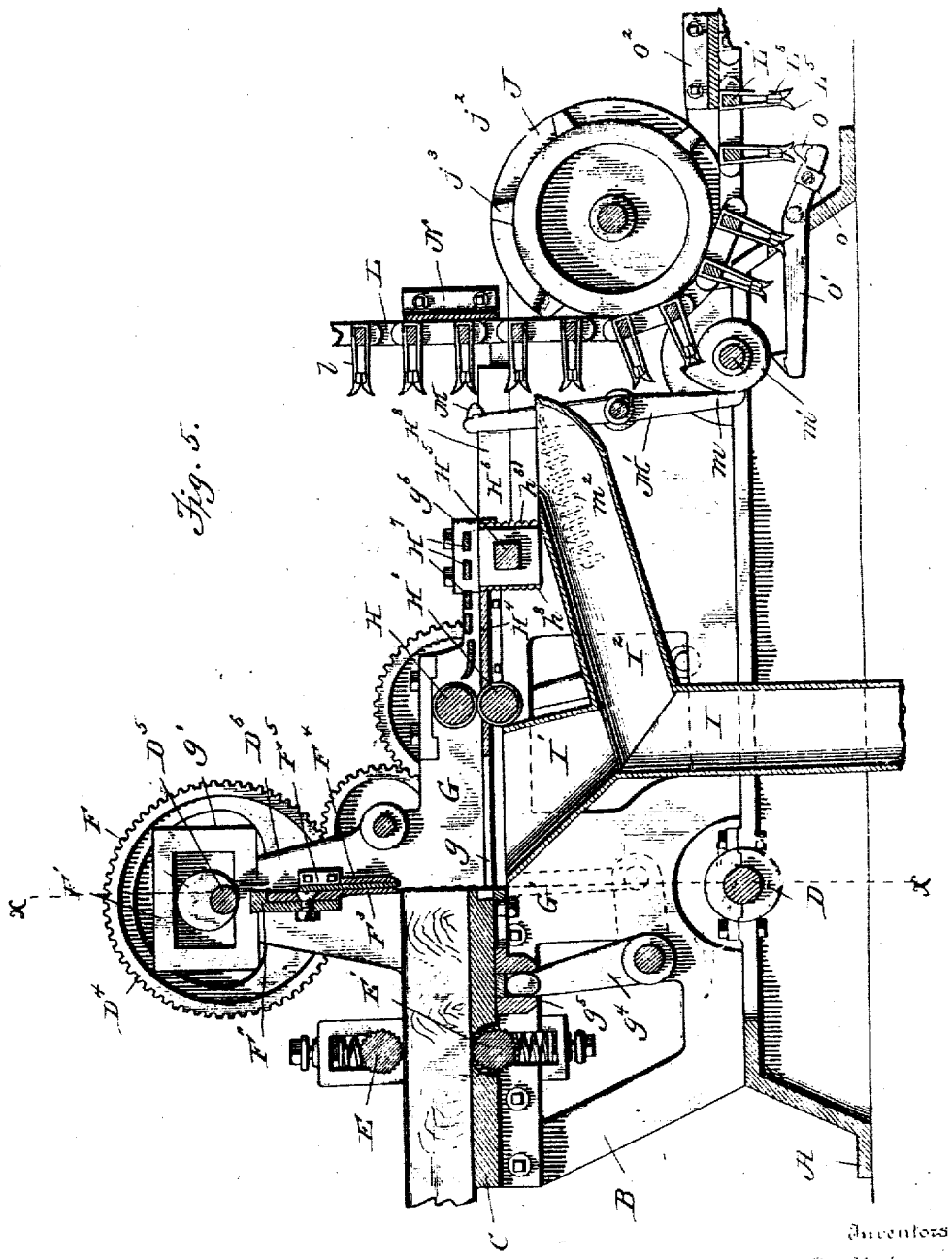

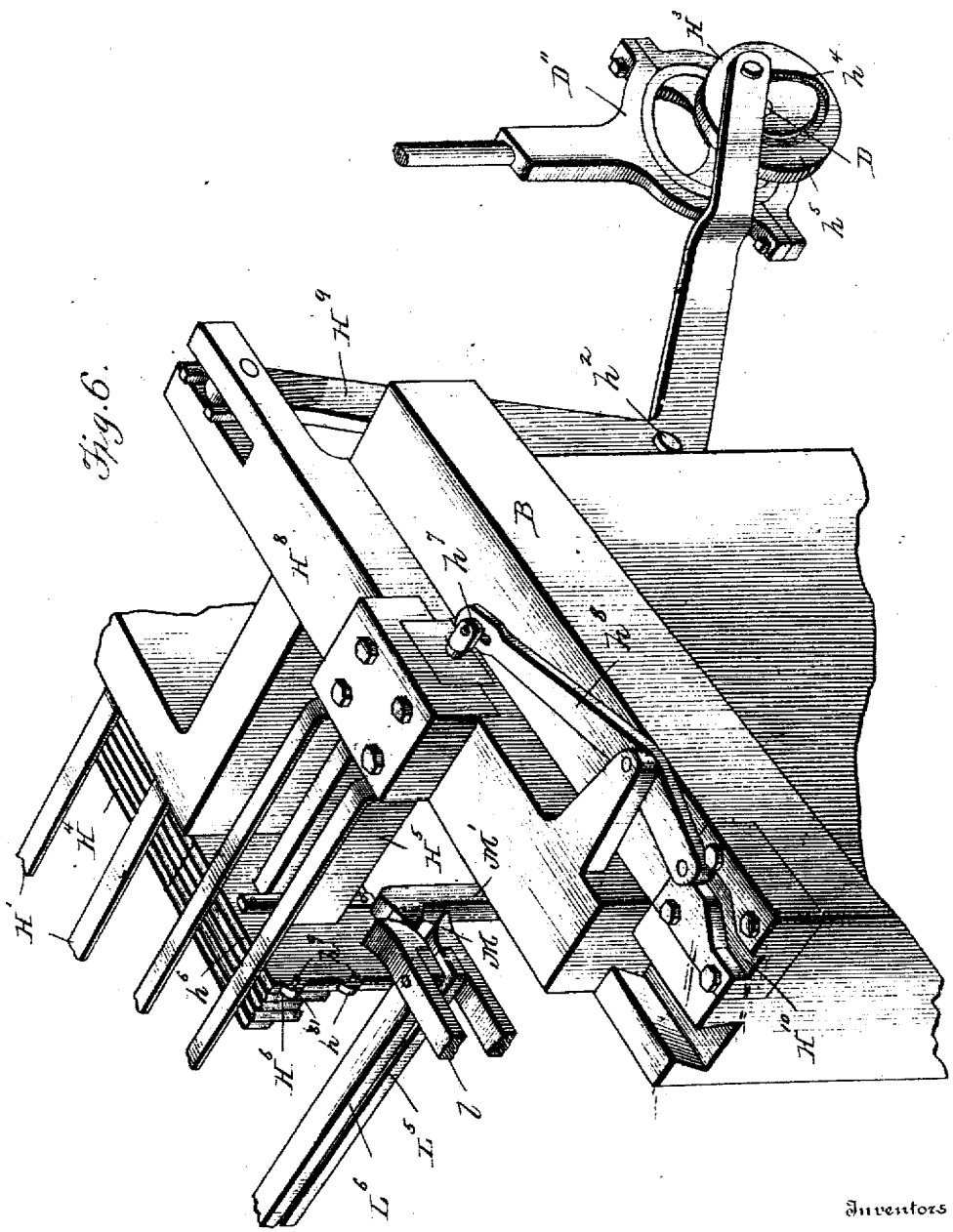

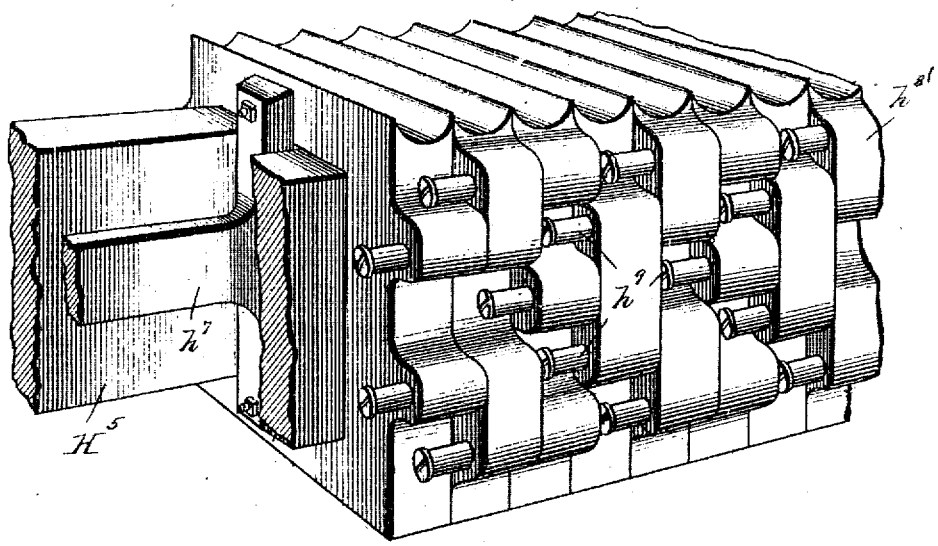

No. 314,210. PATENTED MAR. 6, 1906.
W. R. HOPE & G. A. ROBINSON.
MATCH MAKING MACHINE.
APPLICATION FILED AUG. 4, 1900.
13 SHEETS—SHEET 8.
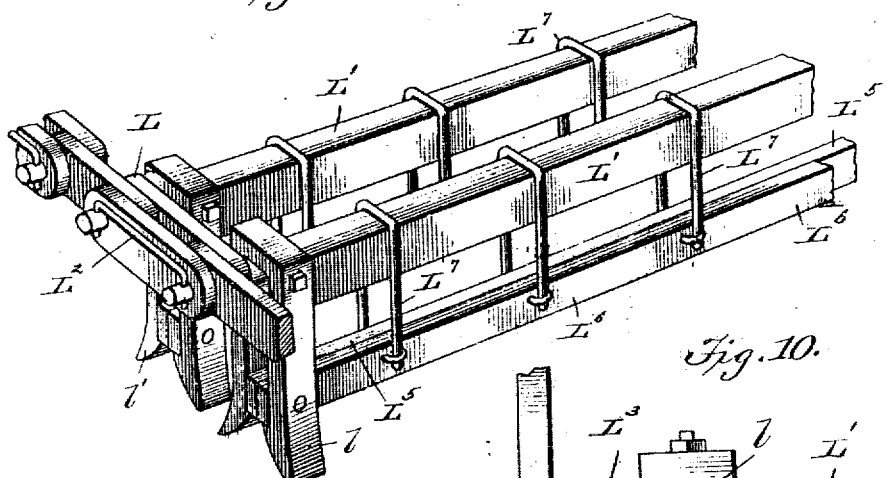
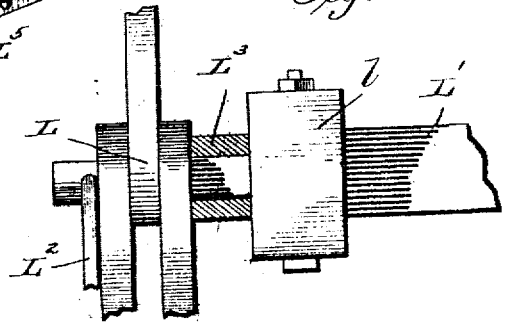
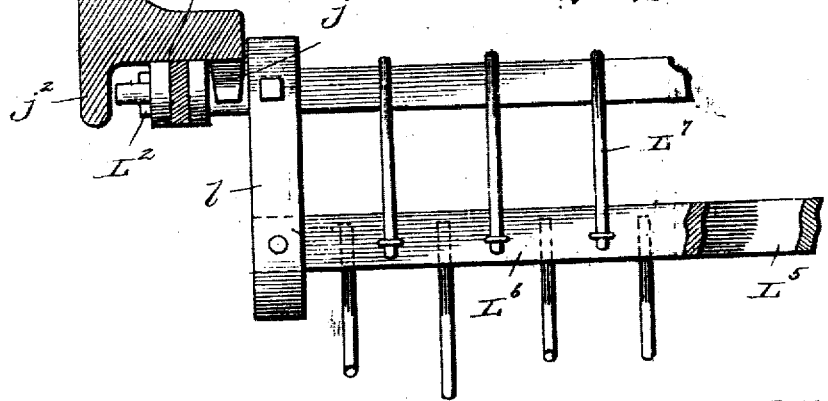
Inventors
Walter R. Hope
George A. Robinson
Witnesses
Attorney

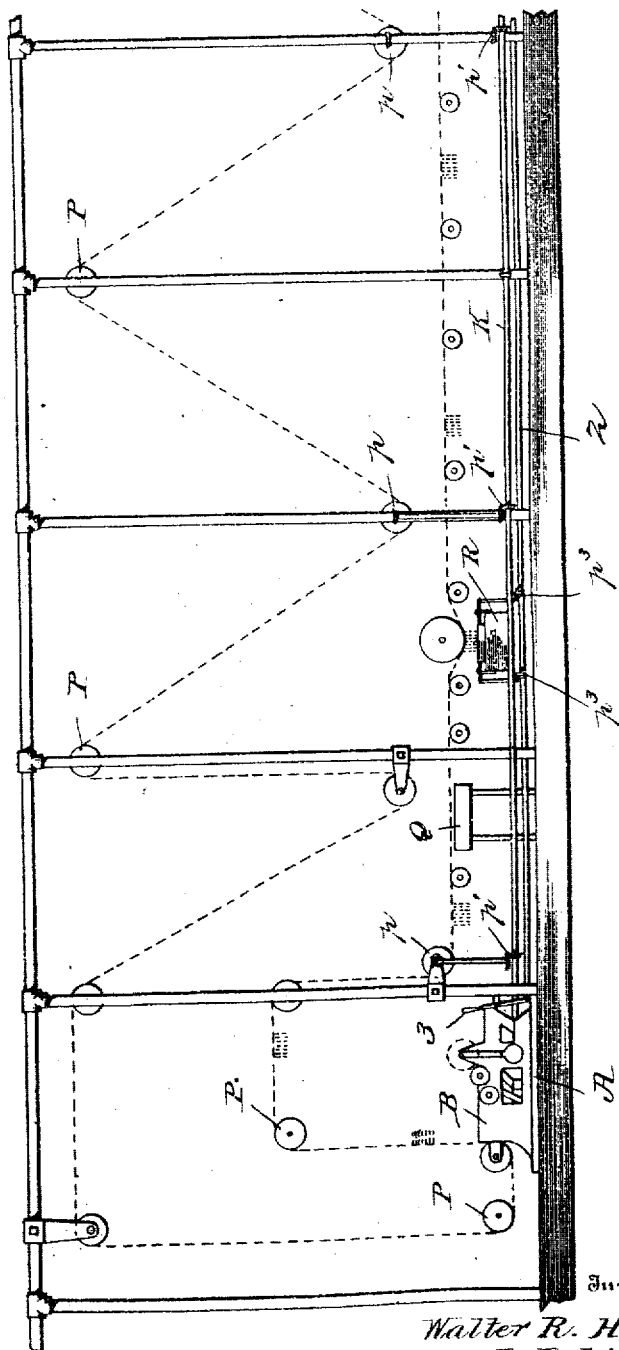

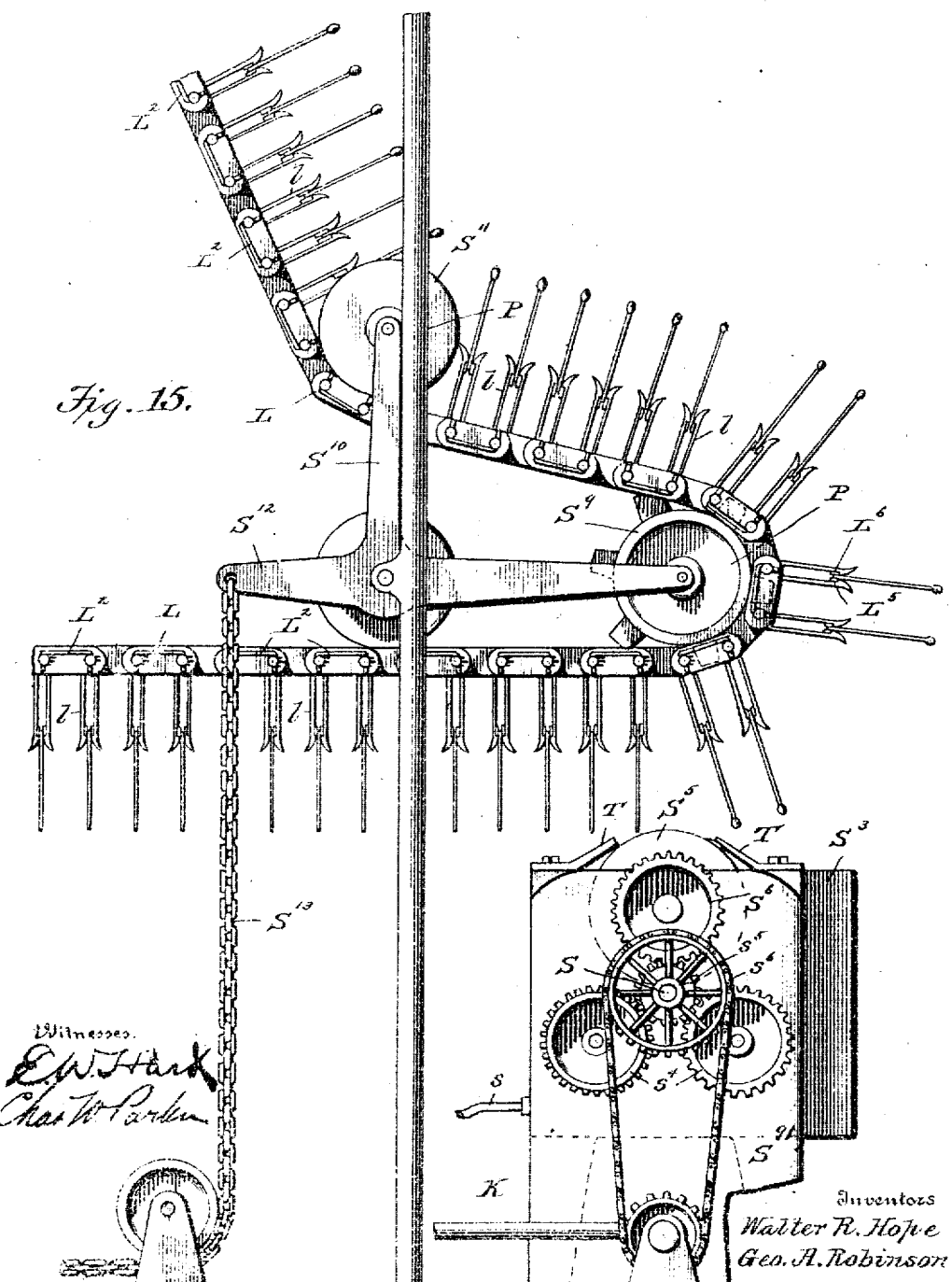

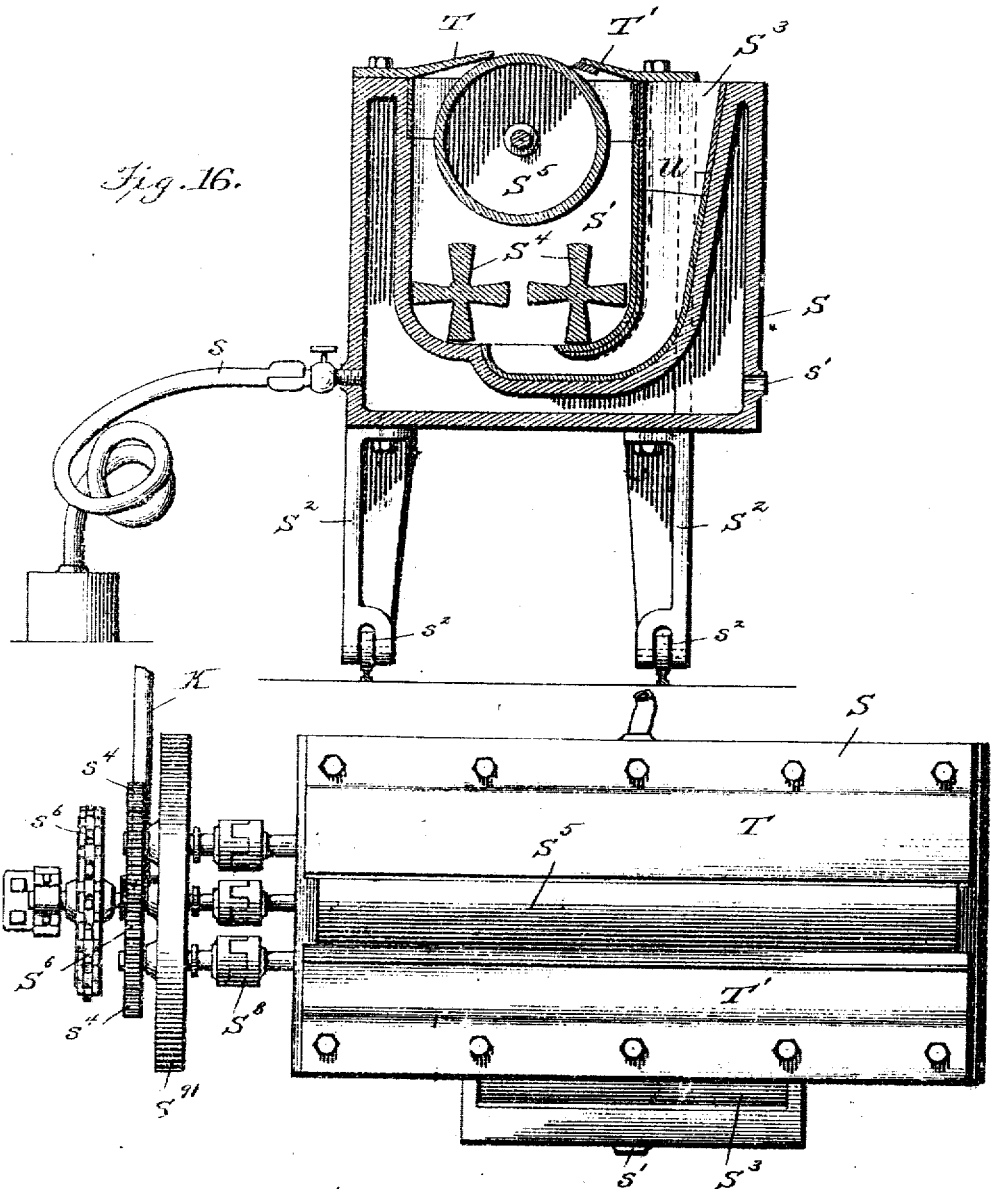

No. 814,210. PATENTED MAR. 6, 1906.
W. R. HOPE & G. A. ROBINSON.
MATCH MAKING MACHINE.
APPLICATION FILED AUG. 4, 1900.
13 SHEETS—SHEET 13.
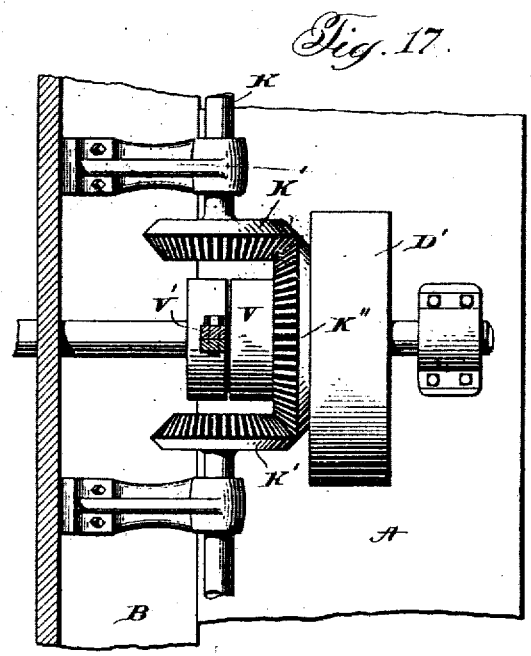
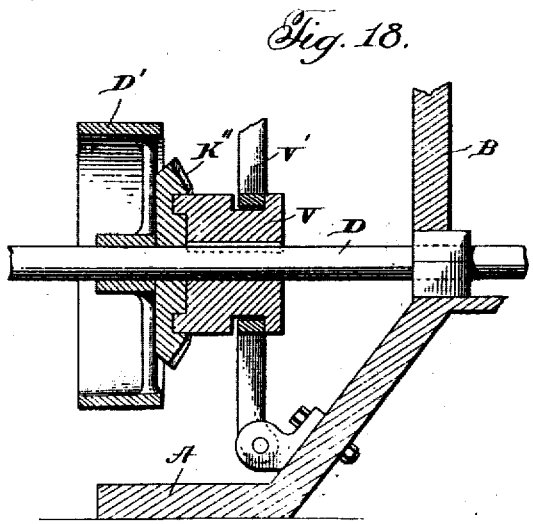

UNITED STATES PATENT OFFICE.

WALTER R. HOPE AND GEORGE A. ROBINSON, OF WILMINGTON, DELAWARE, ASSIGNORS OF ONE-THIRD TO CHARLES FEHRENBACH, OF WILMINGTON, DELAWARE.

MATCH-MAKING MACHINE.

No. 814,210.	Specification of Letters Patent.	Patented March 6, 1906.

Application filed August 4, 1900. Serial No. 25,925.

*To all whom it may concern:*

Be it known that we, WALTER R. HOPE and GEORGE A. ROBINSON, citizens of the United States, residing at Wilmington, in the county of Newcastle and State of Delaware, have invented certain new and useful Improvements in Match-Making Machines; and we do hereby declare the following to be a full, clear, and exact description of the invention, such as will enable others skilled in the art to which it appertains to make and use the same.

This invention relates to an improvement in match-making machines, and it is embodied in the construction, arrangements, and combinations of parts presently to be described, and defined in the claims.

The invention relates more particularly to that type or character of match-making machinery wherein rotary cutters are employed, although the various features of the machine and mechanism can be successfully employed with other match-forming instrumentalities.

The objects of the present invention are to provide a successful, economical, and efficient match-forming machine of the rotary-cutter type; to provide a match-forming machine with improved means and mechanism for receiving, transporting, and discharging the finished splint and do so automatically; the provision of improved mechanism for paraffining; improved mechanism for dipping; improved mechanism for shifting portions of the carrier to remove it from its operative position relative to the dipping-roll; improved arrangement of the carrier-actuating instrumentalities; improved means for governing the various parts of the machine from a single point; mechanisms for actuating the carrying mechanism independently of the cutting mechanism, and in general features and combinations presently to be referred to.

The present machine may be properly termed a "cutting, carrying, and dipping machine;" but in this respect the machine comprises other features and is designed for other operations incident to a complete operative match-making machine.

In the accompanying drawings we have shown a match-making machine embodying our invention. The machine illustrated, however, while being susceptible of satisfactory operation and use, is shown more particularly for the purpose of this specification, and we desire it understood that various changes and modifications both in the construction and arrangement can be made without departing from the nature and principle of the invention.

Figure 14:
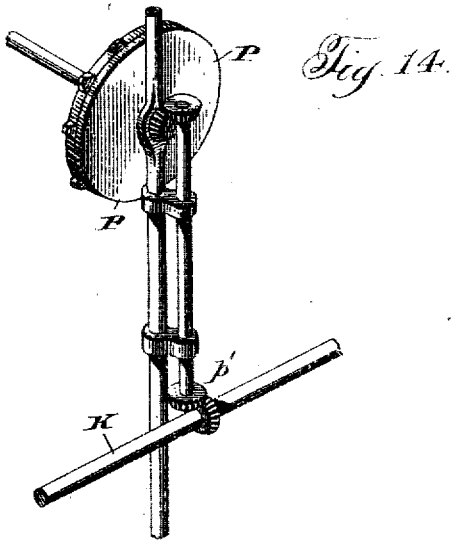

Figure 1 is a side elevation of the cutting-machine or "head," so called. Fig. 2 is a similar view of the opposite side of the same. Fig. 3 is a top plan view of the same. Fig. 4 is a cross-section on the line *x x* of Fig. 5. Fig. 5 is a longitudinal vertical section. Fig. 6 is a perspective view of the separator-actuator means in detail. Figs. 7 and 8 are detail perspective views of the separator. Figs. 9, 10, and 11 are detail views of portions of the carrier. Fig. 12 is a diagrammatic view of a part of the machine, disclosing the forming instrumentalities, heater, and dipping-pan and the operating means for the latter. Fig. 13 is a perspective view, partly in section, of the dipping or paraffining tank. Fig. 14 is a detail perspective of one of the intermediate drive connections. Fig. 15 is an elevation of the rear portion of the machine. Fig. 16 is a sectional view of the composition-chest. Fig. 17 is a detail view of the driving mechanism and clutch. Fig. 18 is a similar view in section. Fig. 19 is a plan view of the composition-chest.

In this specification we shall describe the machine, referring to the various parts in their order.

*Splint-former or head.*—A represents the bed, B the frame of the machine, and C the feed-table located at the rear. The entire mechanism to be presently described is driven by a single driving-shaft D, which is mounted in suitable bearings carried by the bed A and which receives its driving power through any suitable mechanism and from any desired source, conveniently through a driving-belt acting on the drive-pulley D'. The driving-shaft D carries an eccentric D'', to which is strapped a vertical shaft D*, the upper end of which is connected by a pin *d*, mounted on a master-gear D⁴, which in turn is carried by a counter-shaft D⁵, mounted in suitable bearings on the uprights D⁶, springing from the frame of the machine.

E E' designate feed-rollers one arranged above the other, the lowermost having its periphery entered through the aperture in the table C, and both of which are mounted in spring-pressed bearing-boxes, so that a yielding pressure is exerted against the block. These rollers are actuated by having intermeshing gears E'' and E³ on their shafts, and the uppermost shaft being also provided with a ratchet-wheel E⁴, keyed thereon and with which the pawl e engages, the pawl being carried by the arm e', loosely supported on the shaft of the roll E. To the outer end of the arm e is connected a link e², which in turn is connected to a slotted crank-disk e³ on the shaft D⁵. By this mechanism the feed-rollers receive an intermittent movement, and the proportions and adjustments of the various parts are such that the block is fed the required distance during each revolution of the master-gear.

On the shaft D⁵ are secured or formed cams F, the same being embraced by the head-blocks F' of the reciprocating knife-carrier F''. The knife consists conveniently of a plate extending transversely across the machine and has bolted to its forward face the slivering-knife F³ and the spacing-knife F⁴, this latter being secured to the former by bolting or in any other suitable manner, and is designed to insure a uniform cut should there be an overfeed. The lower edges of the knives are tapered and sharpened in any convenient manner, and the knife F³ is positioned to be in line with the forward edge of the feed-table C. Between the knives is placed a stationary plate F⁵, which is conveniently bolted to the uprights D⁶ and serves as a stripping means, preventing the cut-off portion or veneer from being carried upwardly by the upward movement of the knives. The formation of the cams F is such that the reciprocation of the knives is timed to the movement of the feed-rolls, which latter are moved only after the knives are withdrawn.

G designates a receiving-table for the veneer or slice which has been severed from the block. This receiving-table is conveniently slotted longitudinally, as shown in Fig. 3 at g, and is located in a plane below the plane of the feed-table.

Mounted in suitable guides below the table G are reciprocating pushers G', the same moving into recesses in the forward edge of the table C and designed to move forward to carry the veneer into the cutting and forming rolls presently referred to. To actuate the pushers G', a cam g' is formed in the face of the master-gear D⁴, in which rollers g² engage, the same being carried by the vertically-disposed link or rod G², loosely connected at its lower ends to the short arm of a bell-crank G³, pivotally mounted to the frame B and having its opposite arm g⁴ extended upward and loosely engaging in a bite or recess g⁵ in the rear end of the pusher G'. The cam g' is so fashioned that the movement of the pusher is properly timed so as to force the cut veneer forward immediately on its being deposited on the table G.

H and H' designate cutting or forming rolls, and they are conveniently so fashioned on their peripheries that the blades will form a complete cylindrical, square, or any other shape splint in a well-known manner. These rolls are driven by the train of gears H² and H³ and are in turn geared together so as to rotate in the opposite direction, power being derived through the master-gear D⁴. As the formed splints are moved forward by the rotation of the cutting and forming rolls they are moved forward onto the grooved or corrugated table H⁴, the grooves of which correspond conveniently in size and shape to the grooves of the cutting-rollers. That the splints may be held from curling and turning in the grooves a series of bars H'' are employed, the same being located directly above the table H⁴ a distance sufficient to permit the cut splint to pass therebelow, but to prevent its displacement. After the splints have been formed and deposited on the table H⁴ they are, as will be apparent, very closely associated and in many cases may be connected by unsevered fiber or splinters. It is necessary, therefore, that the splints be separated not only for the purpose of insuring against connecting fibers, but also to position them properly for subsequent treatment. To effect this separation, we have devised the following instrumentalities: Mounted on a transverse rectangular shaft H⁵ are a series of plates H⁶. These plates are of a width substantially that of the severed splint, and each is formed on its upper edge with a groove h⁶, corresponding in size with the grooves of the table H⁴. The plates are normally in a position so that the grooves thereof will be in alinement with the grooves of the table H⁴, and as the splints are projected forward onto the grooved plates by the next succeeding splint they are also projected beneath transverse retaining-bars H⁷, carried by the slide, the bars preventing accidental escapement of the splint from the grooved plates. To automatically separate the plates, and thereby the splints, we have found the following mechanism convenient and successful: The rectangular shaft H⁵ is mounted in bearings in slides H⁸, carried on the upper edges of the frame B. These slides are driven backward and forward at the proper interval by a bell-crank H⁹, pivoted to the frame at h². The rear arm of this bell-crank carries a roller h³, which works in a cam-groove h⁴, formed in the disk h⁵ on the driving-shaft D. The opposite arm of the bell-crank has a link connection with the slides H⁸, so that as the bell-crank is moved at the proper interval the slides carrying the rectangular shaft and separating-plates are also moved forward. Mounted on lateral projections on the slides H⁶ are levers h⁸, the rear ends of which have elongated slots therein, in which work the suitable pins carried by the actuating-bars h⁷, extending transversely toward each other. These bars h⁷ enter longitudinal slots or ways in the shaft H⁵ and are connected at their inner ends by having T-heads formed thereon, which are in turn bolted or secured to the outer members of the separator. By forming connections in the manner above described a central pull is secured which materially prevents the binding or clutching of the plates on the rectangular bar. As the bars h⁷ are connected only with the outer plates, it is necessary that the other plates be connected in a manner to insure their proper movement. To accomplish this, we form on the forward and rear edges of the various plates lugs H⁸¹ and conveniently stagger the same, the lugs on the intermediate plates being formed with two openings, one a threaded opening and the other of a large diameter and smooth.

h⁹ designates pins or screws which pass through the large opening of the lugs and engage fixedly with the threaded opening in the adjacent lug. The length of these screws is such as to permit of an independent movement of one plate relative to the other, so that the space between the plates is governed by the length of the screws, the heads thereof preventing an over movement. By this connection it will be observed that a variation in the extent of movement between the plates can be effected. This may be desirable in some instances. As the slides H⁸ are moved forward, carrying the levers h⁸, the forward ends of the levers are carried against cams H¹⁰, mounted on the frame, the inclination of the cams being such as to cause the opposite end of the levers to move outward, and by so moving the plates are separated through the bars h⁷. Cams H¹⁰ are properly inclined to effect the desired separation of the plates and are detachably secured to the frame, so that they can be replaced by cams of different inclination, if desired. As the slides are projected forward the separator is brought into close proximity to the carrier, and in this connection it will be stated that the length of the separating-plates is less than the length of the completed splint, so that the forward ends of the splints project beyond the separator to insure of a close and positive positioning. To hold the severed veneer splints properly on the table G and to relieve the machine of any slivers or foreign substances, we provide an air-trunk I, having two branches I' and I², the former extending up to and directly below the table G, while the latter extends forward directly below the path of the separator. The suction created through this trunk is such as to draw the veneer slip close to the table and collect and remove any slivers or foreign matter from the material as it is separated by the separator. The suction through the trunk may be secured in any desired manner.

*Carrying mechanism.*—The carrying mechanism is of the endless-belt type, having a series of splint-holders, which are transferred from the cutting machine or head to the paraffining and dipping instrumentalities. In our construction we employ a holder or clamp for the entire line of splints.

Mounted in bearings in the rear of the machine are sprocket driving-wheels J, the same being located on opposite sides of the frame. On the outer end of the shaft carrying the sprocket-wheels is a gear J', which meshes with the driving-gear J², which latter is mounted on a shaft extending across the bed and carrying on its opposite end a beveled pinion J³, with which a corresponding pinion J⁴ meshes, the latter being carried by a longitudinal drive-shaft K, mounted in suitable bearings at the side of the machine. The carrier consists of two endless link or chain belts L, through which transverse carrying-bars L' pass, the bars proper being of rectangular formation and having cylindrical ends, which ends pass through the links and serve as connecting-pintles. The bars L' are closely associated, and each bar is provided at opposite ends with two spring-arms l l'. To preserve the bars in their proper position and against rotation, a connecting link or spring L² is employed, the same passing through the extreme ends of the pintle portions at right angles, thus forming a link connection and preventing rotation of the bars in the links. The arms l l' are secured by suitable rivets l² on opposite sides of the shaft, their opposite faces being so fashioned as to snugly fit the bars L'. They are located a short distance from the links, and the space between the bars and the links is on every alternate bar provided with a wearing-collar L³. The teeth on the sprocket-wheels J are formed on the inner flange j, and the periphery of the wheel proper is extended upon the flange j², the teeth j³ on the sprocket being spaced apart sufficiently to engage the alternate bars, so that the flange j' acts as a carrying-flange over which the chain passes, while the teeth engage the bars and serve thereby to force the carrier onward. The flange j² acts to resist the transverse movement of the chain or carrier. The arms l l' have their outer ends flared outwardly to form a V-shaped space between, and directly at the rear of the inclined or flared portion are secured holding-strips L⁵ L⁶, extending transversely from one arm to the other across the machine. These holding-strips may be conveniently faced with felt, leather, or any suitable material, or they may be simply made of wood. They are secured in position by suitable rivets. To insure the proper equal compression throughout the entire length of the holding-strips, we conveniently provide the same with substantially U-shaped springs L', the curved ends of which engage around the bars L', while the free ends are secured to the clamping-bars. It is generally desirable to employ these auxiliary springs; but by strengthening the bars they may be dispensed with. As the splints are projected forward in the separator the machine is so timed and arranged that on each movement of the separator forward a pair of jaws will be presented in direct line with the splints. At this moment an opener M is forced forward, engaging the inclined faces of the spring-arms and forcing the same apart, thus permitting the splints to be inserted between the clamping-bars without interference. The actuation of the opener or expander is governed by a cam. The expander is mounted on the upper end of a rocking lever M', pivoted to the framework, while the lower end of the lever is tipped with steel or other hard material $m$, which engages the cam $m'$, mounted on the shaft of the wheel J. The cam is so fashioned as to cause the expander or opener to approach at proper intervals. It is to be understood that there is an expander or opener and a cam on the opposite sides of the machine, so that the spring-arms on the opposite sides of the carrier may be open simultaneously. As soon as the splints have been properly positioned between the clamping-bars the continued movement of the cam $m'$ releases the lever M, which is immediately withdrawn by a spring $m^2$. In the meanwhile the separator has retreated, received its load, and on its advanced movement the next succeeding clamping-bar is presented, and so on. To form a back stop or support for the carrier-chain at a point directly opposite the separator, we provide supporting-bars N on opposite sides of the machine, the same being connected with the frame. To discharge the matches after they have been completed, we provide expanders O, consisting of levers O', pivoted to the bed and having a hardened projection at their free ends arranged to be operated by the cams $m'$. The ends of these levers are located conveniently directly below the cams, so that the opposite ends are forced upward, carrying the expanders into engagement with the inclined surface of the spring-arms. A weight $o$ is secured to the short arm of the lever O' and serves to return the expander after operation. Directly above the course of the chain and directly above the expanders O are the backing-plates $O^2$, secured to the frame. We have found that by applying power at different points throughout the course the movement of the carrier is largely accelerated. With this in view we secure on suitable frames a series of pulleys or sprocket-wheels P, arranged alternately one above the plane of the other, and on the lower sprocket-wheels we form the bevel-gears $p$, with which the bevel-gears $p'$ engage, the latter being carried by vertical shafts P' and are driven by the longitudinal shafts K through suitable miter-gear connections. The carrier being placed over the pulleys or wheels on its return course is returned to the machine from above, passes into the head or machine, and thence upward and backward and in its outward movement is caused to pass over or through suitable heating-receptacle, as at Q.

*Paraffin-tank.*—We provide a stationary heating vessel R, mounting the same on suitable supports R' and forming the same with a central cavity. In this cavity is placed the paraffining-tank $R^2$, heat being supplied to the heater R, preferably by steam-pipe connections, from a suitable source. The tank $R^2$ is loosely supported in the heater and has at opposite ends upwardly-extending bails $r$, which are pivotally connected to levers $r'$, mounted on standards $r^2$, carried by the heater. The short arms of the levers are connected to suitable rods $R^3$, which in turn are connected with bell-cranks $R^4$, pivotally connected to a stationary part of the machine. The lower arms of these bell-cranks are extended into grooves formed by two collars $r^4$ on an actuating-rod 2, extending the length of the machine. By drawing on the rod 2 the bell-cranks are moved and the position of the tank $R^2$ varied accordingly. In this construction we employ the deflecting and guiding rolls as heretofore. It is to be understood that any suitable mechanism may be employed for feeding the tank $R^2$, the feature of the present improvement residing entirely in the provision of means for regulating or varying the position of the tank in relation to the carrier, so that the splints will not enter the tank.

*Composition-chest.*—At the end of the machine is located in the usual position the composition-chest S. This chest is formed of a hollow metallic casing having a composition-receiving chamber S' therein, the space between the chamber and the outer walls of the chest serving as a steam-heating space into which a flexible steam-conducting pipe $s$ leads from any suitable source, a suitable escape $s'$ being provided in the opposite sides of the tank. This tank is mounted on legs $S^2$, which are conveniently provided with casters $s^2$, so that the tank may bodily be moved.

It has been customary heretofore to supply the composition directly through the opening in the top of the chamber, and as such the result has been that the fresh material before heating is deposited on the top of the agitated heating material. This has been a source of great annoyance, owing to the fact that the fresh material filled in the tank will be the first to be engaged by the dipping-roll. To provide against this objection, we form a feeding-conduit $S^3$, leading from the top of the tank at the side of the composition-chamber downward to and opening into the bottom of the composition-chamber. This conduit, as will be noted, is located in the steam-chest, and therefore under constant heat, so that the material will immediately find its way down through the conduit into the composition-chamber. Conveniently the discharge end of the conduit $S^3$ is at the center of the composition-chamber, and on opposite sides of the opening we place agitators $S^4$ of any approved pattern, but conveniently of a spiral formation. These agitators are driven by gear-wheels $s^4$, secured to the protruding ends of the shafts, which in turn are driven by a pinion $s^5$, driven by the sprocket-chain connection $s^6$, which in turn is actuated by the shaft K. In the upper portion of the composition-chamber is mounted the dipping or composition roll $S^5$. This roll is conveniently of hollow formation and protrudes, as is usual, slightly above the upper end of the tank. It is driven by a gear $S^6$, which in turn meshes with the pinion $s^5$.

T represents a gage-plate, and T' the usual scraper. On the upper wall of the composition-chamber and also the conduit $S^3$ is placed a removable bushing or lining of copper or other material U. This lining extends into the chamber and conduit a considerable distance and is designed to receive the deposit of hardened composition at the upper ends of the chamber and conduit. It is often necessary to remove the congealed or hardened material from the composition chamber and conduit, or, in other words, the uncoupling of the steam connection, which necessarily results in the contents of the chest becoming hardened and which also requires much time and labor. Our chest is provided with flexible steam-pipe connection which will permit of a chest being moved a certain distance beyond the point of danger to the carrier, and at the same time the length of the flexible hose is such that it is not necessary to break the connection, and consequently cut off the steam. Thus the temperature of the chest is maintained during cleaning. In this connection when the chest is ready for cleaning it is only necessary to remove the supplemental lining or bushing U, which has received the major part of the hardened material, thus avoiding the necessity of using water in the chest for washing out that portion which alone, as a rule, is necessary to be cleaned. The use of water in the chest usually results in the destruction of considerable composition which could otherwise be utilized. To construct the driving connection so that the chest can be moved, we form the shafts on the stirrers and dipping or composition roll in sections, uniting them by suitable clutch connections, as at $S^8$, the clutching and unclutching being effected by suitable lever mechanism. To permit of this clutching or separation of the shafts, a bearing-standard $S^9$ is positioned adjacent to the chest and carries the gears and outward portions of the shafts. To remove the carrier-roll $S^9$ and at the same time to preserve the requisite tautness of the carrying-chain, we mount the roll $S^9$ on one end of a bell-crank $S^{10}$, which bell-crank is pivotally supported in a suitable fixed standard. The opposite arm of the bell-crank carries an idler $S^{11}$, which is positioned on the outer faces of the carrier and above the plane of the roll $S^9$.

$S^{12}$ is a crank-arm extending out from the bell-crank, connected therewith by a flexible cable or chain $S^{13}$, which is connected with the rod 2, which, as before stated, extends back to the head or forming-machine and is connected with a suitable lever 3 in reach of the operator. By drawing back on the lever 3 the rod causes the lowering of the paraffin-tank and by the mechanism just described carries the roll $S^9$ upward away from the composition-roll, so that should a fire occur in the composition-chest the operator can quickly remove the carrier from a dangerous position in relation thereto and at the same time the paraffining of the splints be suspended.

*Mechanism for actuating the carrier and splint-former jointly and independently.*—As above stated, the entire forming mechanism is driven from a single shaft—namely, the shaft D. It is often necessary and desirable, however, that the carrier mechanism with associated parts, including the dipping and coacting instrumentalities, be continued to operate until the entire load on the carrier is completed and discharged therefrom, and so without the necessity of running the forming and cutting machine. With this end in view we divide the shaft K into two portions, one running in one direction and the other in the opposite direction, and on the adjacent ends of each portion of the shaft is formed a miter-gear K', which meshes with a similar gear K'', fixedly secured to and forming a part of the band-pulley D'. The pulley D' is loosely mounted on the shaft D, and its rotation, as will be observed, causes the rotation of the shaft K, which actuates the carrier, and the composition roll and stirrers. The pulley D' is coupled to the shaft D, so as to rotate the same by suitable sliding clutch mechanism V, mounted and splined on the shaft D and actuated by suitable lever V' to carry it into and out of engagement with the clutching-faces on the pulley. We have found that a clutch of the interlocking type is eminently satisfactory for the purpose, although any desirable style of clutch may be employed.

The employment of the above-described clutch mechanism is permitted by dividing the shaft K, which is thereby permitted rotation by the pulley independent of the shaft D.

*Operation.*—From the above description of the construction and operation it is thought that a detailed description of the operation is unnecessary. However, the general operation is as follows: A block of wood being inserted on the feed-table, which is grasped by the feed-rollers and advanced to the proper point, the cutting-knives descend, severing the slice or veneer, which is drawn down by the suction created through the pipe I onto the table, and at that moment the pushers are thrown into action, which advances the veneer strip to the cutting-rolls, which immediately draw the strip forward, cutting it into proper shape, and deposit the same forcibly into grooves on the table in advance. The next succeeding group of splints as they issue from the rolls force the preceeding series into and slightly beyond the separating-plates. The machine continues its operation, and during the withdrawal interval of the cutting-knife the separator is actuated, separating the splints and at the same time conducting them to and between the clamping-jaws of the carrier, which latter have been previously opened by the expanders. The clamping-jaws are then set, the separator returned, and the operation repeated. In its progress the set of splints is first carried through a heater, as is usual, and then to the dipping-pan, where the ends of the splints are paraffined. They are from that point carried to the composition-tank, where they are, as usual, brought into contact with the composition-roll and receive the necessary supply of composition. The matches are now carried upward and downward alternately until they reach the forming-machine, at which point they are met by the lower set of expanders and while in their inverted position allowed to drop or fall from the bars and collected either in boxes or in any suitable receptacle.

While we have designated wood as the material to be acted on and of which the splints are formed, we desire it understood that other material can be used, also that strips can be fed to the cutters, in which case the cutters act simply to cut the strips into proper length.

It is to be understood that the drawings forming a part of this specification are not intended to represent in every detail relative actual proportions, but rather that various parts are shown more nearly diagrammatical. The special shaping of cams and the relative sizes of gears have not been considered with absolute accuracy in making the drawings in that the skilled artisan can readily proportion the parts, the inventive idea being, however, clearly expressed.

Having thus described our invention, what we claim as new, and desire to secure by Letters Patent, is—

1. In a match-machine, the combination with feeding instrumentalities, of a forming device, and transversely-movable separating devices for the formed splints, movable in the plane in which the splints lie, substantially as described.

2. In a match-machine, the combination with feeding instrumentalities, of forming instrumentalities and means movable transversely and longitudinally in the plane in which the splints lie, for separating the formed material and carrying the same to a point of deposit, substantially as described.

3. In a match-machine, the combination with feeding instrumentalities, of a forming instrumentality, a separator for the formed device, and means for progressively actuating the separator transversely in the plane in which the splints lie and for moving the same longitudinally, substantially as described.

4. In a match-machine, the combination with means for forming the match-splints and arranging them longitudinally of the machine, of separating means and means for actuating the separating means transversely in the plane of the machine in which the splints lie, substantially as described.

5. In a match-machine, the combination with splint-forming instrumentalities and separating means movable transversely in the plane in which the splints lie and located in rear of the forming instrumentalities, substantially as described.

6. In a match-machine, the combination with forming instrumentalities, of movable separating means for the splints arranged to move the splints sidewise and transversely of the machine in the plane in which the splints lie, substantially as described.

7. In a match-machine, the combination with forming instrumentalities, of means for moving the splints sidewise and transversely of the machine in the plane in which the splints lie, substantially as described.

8. In a match-machine, the combination with cutting and forming rolls, of a separator on which the splints are placed longitudinally, means for actuating the separator to simultaneously move the splints sidewise and transversely of the machine in the plane in which the splints lie, to increase the distance between the splints and means for removing the splints from the separator, substantially as described.

9. In a match-machine, the combination with forming instrumentalities, of a separator for the formed splints comprising a series of separate holders and means for moving the holders transversely to separate said holders in the plane in which they receive the splints from the forming instrumentalities, substantially as described.

10. In a match-machine, the combination with forming instrumentalities, of separating means comprising a series of independent carriers, a loose connection between the carriers and means for moving the carriers toward and from each other, substantially as described.

11. In a match-forming machine, the combination with forming instrumentalities, of separating means comprising a series of independently-movable plates or carrying portions and means for progressively moving the plates toward and from each other, substantially as described.

12. In a match-forming machine, the combination with forming instrumentalities, of a separator consisting of a series of plates linked together, means for moving the plates transversely toward and from each other, and mechanism for advancing the plates, substantially as described.

13. In a match-machine, the combination with forming instrumentalities, of separating instrumentalities, movable transversely in the plane in which the splints lie means for actuating the separating instrumentalities, means for holding the formed splints on the said separating instrumentalities, and an endless carrier for the separated splints, substantially as described.

14. In a match-machine, the combination with forming-rolls, of a grooved receiving-table, means above the table for guiding and retaining the formed splints in the grooves and movable separating devices for individually separating the splints movable longitudinally of the splints, substantially as described.

15. In a match-machine, the combination with forming-rolls, of a grooved receiving-table and a separator consisting of a series of movable members and means for moving the members to move the splints sidewise and transversely of the machine in the plane in which the splints lie, substantially as described.

16. In a match-machine, the combination with forming-rolls, of a grooved separating-table, means for retaining the formed splints in the grooves, a separator for individually separating the splints, a carrier, and means for moving the separator to and from the table, substantially as described.

17. In a match-machine, the combination with forming instrumentalities, an individual splint-separator for increasing the distance between adjacent splints in the plane in which they receive the splints from the cutting mechanism, and means for reciprocating the separator, substantially as described.

18. In a match-machine, the combination with forming instrumentalities, of individual splint-separating means for increasing the distance between adjacent splints, and means advancing the separating means toward a carrier, and said carrier, substantially as described.

19. In a match-forming machine, the combination with forming instrumentalities, of a separator comprising a series of movable members, mechanism for moving the members transversely in the plane in which the splints lie and means for reciprocating the separator toward and from a carrier, and said carrier, substantially as described.

20. In a match-machine, the combination with forming instrumentalities, a separator consisting of a series of movable members, a support therefor and mechanism for moving the members transversely in the plane in which the splints lie and advancing the support toward a carrier, and said carrier, substantially as described.

21. In a match-forming machine, the combination with forming-rolls, of a separator consisting of a series of plates having means for carrying splints, staggered lugs on the adjacent plates, a loose connection between the lugs of one plate and the lugs of the other plate, a support for the plates and levers for moving the plates, substantially as described.

22. In combination with forming instrumentalities, of a separator consisting of a series of plates having openings therein, a loose connection between the plates, seats on the upper edges of the plates and lever mechanism connecting with the outer plates for moving the plates toward and from each other, substantially as described.

23. In a match-machine, the combination with a driving-shaft having an eccentric thereon, of a master-gear, a connection between the eccentric and master-gear for actuating the latter, a shaft carrying the master-gear, a feeding mechanism, a connection between the shaft and said feeding mechanism for actuating the same, a cam on said shaft, a pusher mechanism, a link connection between said cam and said pusher mechanism, and a knife actuated by said master-gear shaft, substantially as described.

24. In a match-machine, the combination with splint-forming instrumentalities, of splint-separating means, reciprocating slides, means for reciprocating the same, means carried by the slides for actuating the separating means, and stationary means for actuating the said actuating means for the separating means, substantially as described.

25. In a match-machine, the combination with a frame, of slides thereon, transversely-movable separating means carried by the slides, levers pivoted on the slides, connections between the levers and separating means, cams engaging the levers, and splint-forming instrumentalities, substantially as described.

26. In a match-machine, the combination with a frame, of a driving-shaft, a cam on the shaft, slides on the frame, a separating means carried by the slides, a lever engaging the cam and actuating the slides, means for moving the separating means upon the movement of the slides and splint-forming mechanism in advance of the separator, substantially as described.

27. In a match-forming machine, the combination with the forming instrumentalities, of a carrier, splint receiving and clamping mechanism on the carrier comprising spring-arms and connecting-strips on the outer ends of the arms and mechanism for opening said clamping mechanism to receive the splints, substantially as described.

28. In a match-machine, the combination with the forming instrumentalities, of a carrier, comprising movable clamping-bars, spring-arms carrying the bars, reciprocating mechanism for moving the arms to separate the bars so that they may receive the splints, substantially as described.

29. In a match-machine, the combination with forming instrumentalities, of a carrier consisting of endless belts, of bar connections between the belts, spring-arms secured to the bars, having inclined outer ends, clamping-bars secured to the outer ends of the spring-arms and mechanism for engaging the inclined ends for separating the arms at intervals, substantially as described.

30. A carrier for a match-machine comprising endless belts, bars connecting the belts, spring clamping members carried by the bars, and means locking two bars together for preventing the rotation of the bars on the belts, substantially as described.

31. A carrier for match-machines consisting of endless belts, bars connecting the belts, spring-arms on the bars, clamping-bars carried by the arms, and means for preventing independent rotation of the arms on the belts comprising rod connections between adjacent bars, substantially as described.

32. In a match-machine, the combination with a carrier, comprising endless belts and spring-actuated clamping-arms, of clamping-bars carried by the arms and auxiliary springs engaging the bars between their ends, substantially as described.

33. In a match-machine, the combination with carrier-chains, of bars connected to the same, spring-arms carried by the bars, clamping-bars carried by the outer ends of the arms and auxiliary springs secured to the connecting-bars and having their outer ends secured to the clamping-bars, substantially as described.

34. In a match-machine, the combination with a carrier comprising an endless belt, means for maintaining the carrier in a regular course during its movement, a paraffin-pan located below the carrier, means for applying heat to the pan, and mechanism independent of the carrier for elevating and lowering the paraffin-pan into and out of the path of the splints carried by the carrier during the stationary and moving periods of the carrier and for retaining the same in its elevated and lowered positions, substantially as described.

35. In a match-machine, the combination with an endless carrier for the formed splints, of a paraffin-pan, and independently-actuated means for raising and lowering the pan into and out of the path of the splints carried by the carrier, substantially as described.

36. In a match-machine, the combination of a carrier, of a dipping-pan, a heater therefor, levers supporting the dipping-pan and means for actuating the levers to raise and lower the dipping-pan during the movement of the carrier and retaining it in its different positions, substantially as described.

37. In a match-machine, the combination of a carrier, of a dipping-pan, a heater therefor, levers, a link connection between the levers and the pan, bell-cranks, means for actuating the bell-cranks and connections between the bell-cranks and the levers, substantially as described.

38. In a match-machine, the combination with a recessed heater, of standards thereon, a dipping-pan located in the recess, levers mounted on the standards, connections between the levers and the pan to take it out of the course of the splints and retain it in its adjusted position, a mechanism acting simultaneously to actuate the levers and change the position of the tank, substantially as described.

39. In a match-machine, the combination with a splint-forming mechanism and a carrier, of a dipping-pan, mechanism for moving the dipping-pan out of the course of the splints and retain it in its adjusted positions and means extending back to the former for actuating said moving means, substantially as described.

40. The combination with a carrier, of a vertically-movable dipping-pan, a heater therefor, levers for moving the dipping-pan, bell-cranks for moving the levers and a reciprocating rod engaging the bell-cranks for moving the same, substantially as described.

41. In a match-machine, the combination with a movable endless carrier, and means for deflecting the same at one point of a paraffining-tank below the deflected portion, and normally in the path of the splints, carried by the carrier, and means for lowering the paraffining-tank out of the path of the splints and retaining it in its lowered position, whereby the tank can be removed when the carrier is stopped.

42. In a match-machine, the combination with the forming mechanism, a carrier for the formed splints, a composition-tank having its dipping-roll arranged in the path of the splints, a paraffining-tank and means for changing the course of the splints in relation to the roll and simultaneously the relative position between the path of the splints and the dipping-tank, substantially as described.

43. In a match-machine, a composition-tank consisting of a hollow shell having a composition receptacle or pocket formed therein and a feed-duct discharging through the bottom of the receptacle or pocket, and a surrounding heating-chamber for the duct and pocket, substantially as described.

44. In a match-machine, a composition-tank, means for heating the tank, comprising a chamber and means for conveying the heating medium to the chamber, and a composition pocket or chamber in the tank, a feeding duct or passage extending from the top of the tank downward into the same and discharging into the bottom of the composition-chamber, substantially as described.

45. In a match-machine, the combination with a composition-chest and means for heating the same, of a receiving-chamber, agitators in the chamber, and a composition-feed for the chamber, extending to the outside of the tank in contact with the heating means and entering the chamber below the upper end thereof, substantially as described.

46. In a match-machine, a composition-tank comprising a heating-chamber and a composition-chamber, and a feed for the composition-chamber passing through the heating-chamber in proximity to and into the composition-chamber at a point below the top thereof, substantially as described.

47. In a match-machine, a composition-tank comprising a heating-chamber, a composition-chamber, a feed duct or channel entering from the top of the tank and extending downward through the heating-chamber and entering the base of the composition-chamber, substantially as described.

48. In a match-machine, a composition-tank consisting of a hollow tank having a composition-chamber therein, means for conducting a heating medium to the tank, a dipping-roll, agitators in the bottom of the chamber and means arranged to be heated by the heating medium and extending downward into the hollow tank and into the composition-chamber at the base thereof for supplying composition to the chamber at a point between the agitators and below the same, substantially as described.

49. In a match-machine, a composition-tank having provisions for heating the same and formed with a composition-chamber, of a dipping-roll and a removable section of lining located in the upper portion only of the chamber, substantially as described.

50. In a match-machine, the combination with a composition-tank, of a dipping-roll and a removable section of lining in the upper portion only of the composition-chamber of the tank, and a feed for the chamber entering the same below the lining, substantially as described.

51. In a match-machine, a composition-tank having a composition-chamber therein and means for heating the same, of a removable section of lining in the upper portion of the chamber, substantially as described.

52. In a match-machine, the combination with a composition-tank having a composition-chamber therein and means for heating the same, of a supplemental section of lining for the interior of the chamber at or near the upper edge thereof adjacent to the opening therein, substantially as described.

53. In a match-machine, a composition-tank provided with a composition-chamber and heating-means therefor, of a removable collecting-wall surface located in the chamber near the open upper end thereof for the purposes specified.

54. In a match-machine, a composition-tank and means for heating the same, of an independently-removable protector for the upper portion of the tank on which the condensed material collects, the same being located adjacent to the upper open end of the tank, substantially as described.

55. In a match-machine, the combination with a composition-chest containing a dipping-roll, means for driving the roll, a separable coupling between the driving means and the roll, and a flexible and extensible folding heat-conductor leading to the chest, substantially as described.

56. In a match-machine, the combination with a carrier, of the movable composition-tank and a removable collecting - surface within the upper portion of the tank independent of the inner wall of the chamber of the tank adjacent the opening therein, substantially as described.

57. In a match-machine, the combination with a carrier, of a composition-tank provided with suitable supports and rollers on the supports whereby the tank may be moved and means for supplying heat to the tank constantly in its various adjusted positions, comprising a flexible folding conductor, substantially as described.

58. In a match-machine, the combination with a carrier, of a bell-crank, a roll carried by one arm of the bell-crank, idlers carried by the other arm and means connected with a projection on the bell-crank for rocking the bell-crank to elevate the roll and to depress the idlers, substantially as described.

59. In a match-machine, the combination with a carrier, of a lever, a roll carried by the lever and around which the carrier passes an arm connected with the lever, an idler carried by the arm, and against which the carrier engages, and means connected with a projection at an angle to the arm and lever for tilting the lever and the arm simultaneously, substantially as described.

60. In a match-machine, the combination with forming mechanism, of a driving-shaft, means for driving the shaft, a sectional longitudinal shaft, a gear connection between the same and the driving-shaft, a carrier and a dipping-roll actuated by the sectional shaft, and a clutch mechanism between the driving-shaft and the forming mechanism whereby the driving-shaft may drive the carrier and the said roll independent of the forming mechanism, substantially as described.

61. In a match-machine, a composition-chest having provisions for heating the same and a composition-chamber, of a feed-conduit leading into the chamber from below, and a removable lining for the upper end of the conduit, substantially as described.

62. In a match-machine, the combination with a composition-chest having provisions for heating the same, of a composition-chamber, a feed-conduit leading from the upper end of the chest downward and entering the bottom of the chamber and a removable wall at the upper end of the conduit.

63. In a match-machine, a composition-chest having provisions for heating the same, and a composition-chamber, of a feed-conduit leading into the chamber below the top thereof and removable linings for the upper portions of the chamber and the conduit.

64. In a match-machine the combination with forming instrumentalities, of reciprocatory means movable in the plane in which the splints lie for feeding the splints forward and separating them during the forward-moving interval.

65. In a match-machine the combination with forming instrumentalities, of reciprocatory mechanism for progressively moving the splints longitudinally and laterally.

66. In match machinery, the combination with cutting mechanism of a plurality of separable splint-receivers and means for separating said receivers in the plane in which they receive the splints from the cutting mechanism.

In testimony whereof we affix our signatures in presence of two witnesses.

WALTER R. HOPE.
GEORGE A. ROBINSON.

Witnesses:
THOMAS REARDON,
GEORGE C. SCHULES.